US009369915B2

(12) United States Patent
Hooli et al.

(10) Patent No.: US 9,369,915 B2
(45) Date of Patent: Jun. 14, 2016

(54) INTER-SYSTEM INTERFERENCE IN COMMUNICATIONS

(75) Inventors: Kari Juhani Hooli, Oulu (FI); Jari Yrjana Hulkkonen, Oulu (FI); Rauli Jarkko Kullervo Jarvela, Oulu (FI); Pasi Eino Tapio Kinnunen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/348,121

(22) PCT Filed: Sep. 28, 2011

(86) PCT No.: PCT/FI2011/050840
§ 371 (c)(1),
(2), (4) Date: May 16, 2014

(87) PCT Pub. No.: WO2013/045741
PCT Pub. Date: Apr. 4, 2013

(65) Prior Publication Data
US 2014/0315561 A1 Oct. 23, 2014

(51) Int. Cl.
*H04W 16/14* (2009.01)
*H04W 28/02* (2009.01)
*H04W 52/04* (2009.01)

(52) U.S. Cl.
CPC .......... *H04W 28/0236* (2013.01); *H04W 16/14* (2013.01); *H04W 52/04* (2013.01)

(58) Field of Classification Search
CPC ............. H04W 52/24; H04W 52/241–52/244; H04W 72/1215; H04W 72/082
USPC ................................. 455/434, 450–453, 522
See application file for complete search history.

(56) References Cited

U.S. PATENT DOCUMENTS

| 2004/0106412 A1* | 6/2004 | Laroia ................... H04W 16/12 455/448 |
| 2005/0026616 A1 | 2/2005 | Cavalli et al. ................. 455/436 |
| 2009/0191906 A1* | 7/2009 | Abedi .................... H04W 16/14 455/501 |

(Continued)

FOREIGN PATENT DOCUMENTS

| EP | 2073587 A2 | 6/2009 |
| JP | 2010178225 A | 8/2010 |

OTHER PUBLICATIONS

Likitthanasate, P. et al.; "Spectrum etiquettes for terrestrial and high-altitude platform-based cognitive radio systems"; IET Commun., Vo. 2, No. 6; 2008; pp. 846-855.

(Continued)

*Primary Examiner* — Kamran Afshar
*Assistant Examiner* — Ather Mohiuddin
(74) *Attorney, Agent, or Firm* — Harrington & Smith

(57) ABSTRACT

An inter-system interference estimation method is disclosed for both primary and secondary radio systems. In the case of a primary system (such as a GSM system), inter-system interference estimation is based on a comparison of cell level measurement statistics before and after secondary spectrum usage in neighboring cells. In the case of a secondary system (such as an LTE system), inter-system interference estimation is based on a measurement on secondary spectrum before starting transmission on the secondary spectrum. Based on both of the above mentioned inter-system inter-cell interference estimations, a cell-level decision on the secondary spectrum usage is made, and optimization of radio resource allocation inside the systems may be carried out.

15 Claims, 5 Drawing Sheets

(56) References Cited

U.S. PATENT DOCUMENTS

| | | | | |
|---|---|---|---|---|
| 2010/0113060 | A1* | 5/2010 | Bai | H04W 16/14 455/453 |
| 2010/0248736 | A1* | 9/2010 | Hulkkonen | H04W 16/14 455/452.2 |
| 2011/0096703 | A1* | 4/2011 | Nentwig | H04B 7/2643 370/294 |
| 2012/0028664 | A1* | 2/2012 | Zhang | H04W 16/14 455/501 |
| 2012/0046030 | A1* | 2/2012 | Siomina | G01S 5/00 455/423 |
| 2012/0108249 | A1* | 5/2012 | Talwar | H04W 72/0473 455/450 |

OTHER PUBLICATIONS

Likitthanasate, P. et al.; "Spectrum etiquettes for terrestrial and high-altitude platform-based cognitive radio systems"; IET Communications, vol. 2, Issue 6; Jul. 2008; abstract.

* cited by examiner

INTER-SYSTEM INTERFERENCE IN COMMUNICATIONS

FIELD OF THE INVENTION

The exemplary and non-limiting embodiments of this invention relate generally to wireless communications networks, and more particularly to managing inter-system interference.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In cellular mobile communication, frequency spectrum is divided into non-overlapping spectrum bands which are assigned to different cells. However, after certain geographical distance, the frequency bands are reused, i.e. the same spectrum bands are re-assigned to other distant cells. Besides signals within the cell, signals at the same frequencies arrive at the receiver from undesired transmitters located in some other cells and may lead to deterioration in receiver performance. Originally, communications systems have been planned to cope with intra-system interference; e.g. frequency reuse and frequency hopping methods have been used in GSM system. Moreover, intra-system interference may be controlled with various radio resource management methods. However, a problem arises when different radio technologies are operating on the same frequency resources on nearby cells.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatus, computer program and a computer-readable storage medium as defined in the independent claims. Further embodiments of the invention are disclosed in the dependent claims.

According to an aspect of the present invention, there is provided a method comprising obtaining, in a network apparatus, information on a reference interference level value defined for a first cell utilizing a primary radio access technology, the reference level interference value for the first cell indicating incoming interference to the first cell by a secondary radio access technology; obtaining, in the network apparatus, information on an estimated emitted transmission power value measured for a second cell utilizing the secondary radio access technology; obtaining, in the network apparatus, information on an estimated inter-system interference value defined for the first cell, wherein the estimated inter-system interference value defined for the first cell is calculated by comparing the reference level interference value defined for the first cell to an interference level value defined for the first cell when the secondary radio access technology is using the shared radio spectrum block; controlling, in the network apparatus, the usage of the shared radio spectrum in the second cell based on the estimated emitted transmission power value measured for a second cell and the estimated inter-system interference value defined for the first cell, wherein the shared radio spectrum usage in the second cell is controlled by allowing the usage of the shared spectrum for the secondary radio access technology in the second cell, and, optionally, defining a maximum allowed transmission power for the secondary radio access technology transmission on the shared radio spectrum in the second cell, or by preventing the usage of the shared spectrum for the secondary radio access technology in the second cell.

According to another aspect of the present invention, there is provided an apparatus comprising a communication control circuitry configured to obtain information on a reference interference level value defined for a first cell utilizing a primary radio access technology, the reference level interference value for the first cell indicating incoming interference to the first cell by a secondary radio access technology; obtain information on an estimated emitted transmission power value measured for a second cell utilizing the secondary radio access technology; obtain information on an estimated inter-system interference value defined for the first cell, wherein the estimated inter-system interference value defined for the first cell is calculated by comparing the reference level interference value defined for the first cell to an interference level value defined for the first cell when the secondary radio access technology is using the shared radio spectrum block; control the usage of the shared radio spectrum in the second cell based on the estimated emitted transmission power value measured for a second cell and the estimated inter-system interference value defined for the first cell, by allowing the usage of the shared spectrum for the secondary radio access technology in the second cell, and, optionally, defining a maximum allowed transmission power for the secondary radio access technology transmission on the shared radio spectrum in the second cell, or by preventing the usage of the shared spectrum for the secondary radio access technology in the second cell.

According to another aspect of the present invention, there is provided an apparatus comprising means for carrying out the method.

According to yet another aspect of the present invention, there is provided an apparatus comprising at least one processor; and at least one memory including a computer program code, wherein the at least one memory and the computer program code are configured to, with the at least one processor, cause the apparatus to obtain information on a reference interference level value defined for a first cell utilizing a primary radio access technology, the reference level interference value for the first cell indicating incoming interference to the first cell by a secondary radio access technology; obtain information on an estimated emitted transmission power value measured for a second cell utilizing the secondary radio access technology; obtain information on an estimated inter-system interference value defined for the first cell, wherein the estimated inter-system interference value defined for the first cell is calculated by comparing the reference level interference value defined for the first cell to an interference level value defined for the first cell when the secondary radio access technology is using the shared radio spectrum block; control the usage of the shared radio spectrum in the second cell based on the estimated emitted transmission power value measured for a second cell and the estimated inter-system interference value defined for the first cell, by allowing the usage of the shared spectrum for the secondary radio access technology in the second cell, and, optionally, defining a maximum allowed transmission power for the secondary radio access technology transmission on the shared radio spectrum in the second cell, or by preventing the usage of the shared spectrum for the secondary radio access technology in the second cell.

According to yet another aspect of the present invention, there is provided a computer program comprising program code means adapted to perform the method steps when the program is run on a computer.

According to yet another aspect of the present invention, there is provided a computer readable storage medium comprising computer readable code for executing a computer process according to the method.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
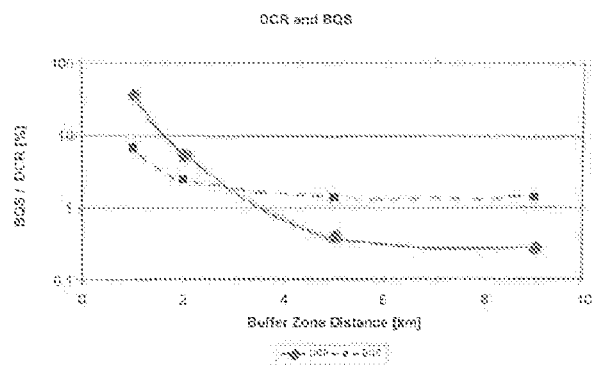
FIG. 1 shows a schematic diagram illustrating exemplary co-channel interference.

An exemplary embodiment relates to spectrum sharing between radio access technologies (RAT), inter-system interference estimation and management. Use cases of inter-system interference estimation and control may include, for example, spectrum re-farming from RAT to another RAT, dynamic spectrum usage between RATs and inter-operator IMT spectrum sharing. This enables more efficient usage of the available spectrum resources by enabling more flexible spectrum utilization over multiple RATs.

Flexible radio resource usage is a key target of cognitive radio networks. There are related activities on-going in ETSI RRS, such as RRS operation in GSM and IMT bands, and usage of radio environment maps. Dynamic spectrum re-farming (DSR) also is an interesting topic.

Current networks operate on various radio technologies, such as GSM, HSPA and LTE. Radio resources (especially spectrum resources) are limited, and therefore optimization of the radio resource usage over the technologies is required. For example, 900 MHz and 1800 MHz bands have been used only for GSM in the past, but recently HSPA was also allocated to the 900 MHz band, causing GSM-HSPA co-existence in the 900 MHz band. Furthermore, it is expected that also LTE will be allocated at least to the 1800 MHz band. In the future, there may be any combination of these technologies (or some other already existing, or a new technology) operating in the same band, which means co-existence and inter-system interference.

A situation where different technologies (e.g. GSM and LTE) are operating on the same radio frequency resources on nearby cells, may cause inter-system inter-cell interference. Exemplary system-level performance results are shown below in Table 1.

TABLE 1

| System-level LTE performance simulation results with inter-cell GSM interference. | | |
|---|---|---|
| | LTE cell average TP (kbps) | LTE capacity loss |
| Reference performance: no GSM interference | 1 500 | |
| Uncontrolled GSM interference (GSM interference from neighbouring cells) | 920 | 39% |
| 3 × cell radius isolation between GSM and LTE (total 18 buffer cells between GSM and LTE) | 1 460 | 3% |

In the exemplary simulation of Table 1, it is assumed that GSM and LTE are sharing the spectrum and there was no interference control method in use. It may be seen that LTE cell average throughput is about 40% lower in the case of uncontrolled GSM interference, i.e. in the situation where neighbouring GSM cells transmit using the same frequency as LTE. Another simulation is performed to demonstrate how a buffer zone between the systems may be used to control inter-system interference. In the exemplary simulation, one tier of 3-sectorized base stations form a buffer zone (total 18 cells) around the LTE cell, and it may be seen how this improves the performance. This way quality may be maintained at a high level, but a drawback is that there are a high number of cells (buffer cells) in which the shared frequency block cannot be used in either of the technologies.

In another exemplary simulation, HSPA is interfering GSM voice traffic, as shown in FIG. 1. FIG. 1 illustrates GSM drop call rate (DCR) and bad quality samples (BQS) in the case of co-channel HSPA interference from nearby cells, simulated with different isolation distances. In this evaluation, the impact of inter-system isolation distance is studied. It may be seen how GSM voice quality degrades when isolation distance between GSM and HSPA base stations is less than 5 km. It may be assumed that LTE interference impact towards GSM is somewhat similar to that of HSPA because of the wideband carriers and frequency reuse factor of 1 both in the HSPA and LTE systems.

An exemplary embodiment provides a solution for inter-system interference estimation, and enables providing tools for inter-system interference control, e.g. for minimizing number of buffer zone cells.

An exemplary inter-system interference control solution is to have an isolation distance (also referred to as a buffer zone) between base stations transmitting on the same frequency but using different technology. Some simulation results are shown in Table 1 and FIG. 1. By having a high enough isolation distance (e.g. based on worst case link budget calculation), inter-system interference levels may be kept below noise level, and this way harmful interference between the systems may be avoided. However, this typically requires very long isolation distances, from about 5 to 10 km (urban area) up to about 50 km (rural area), which thus significantly limits the flexibility of spectrum usage.

Figure 2:
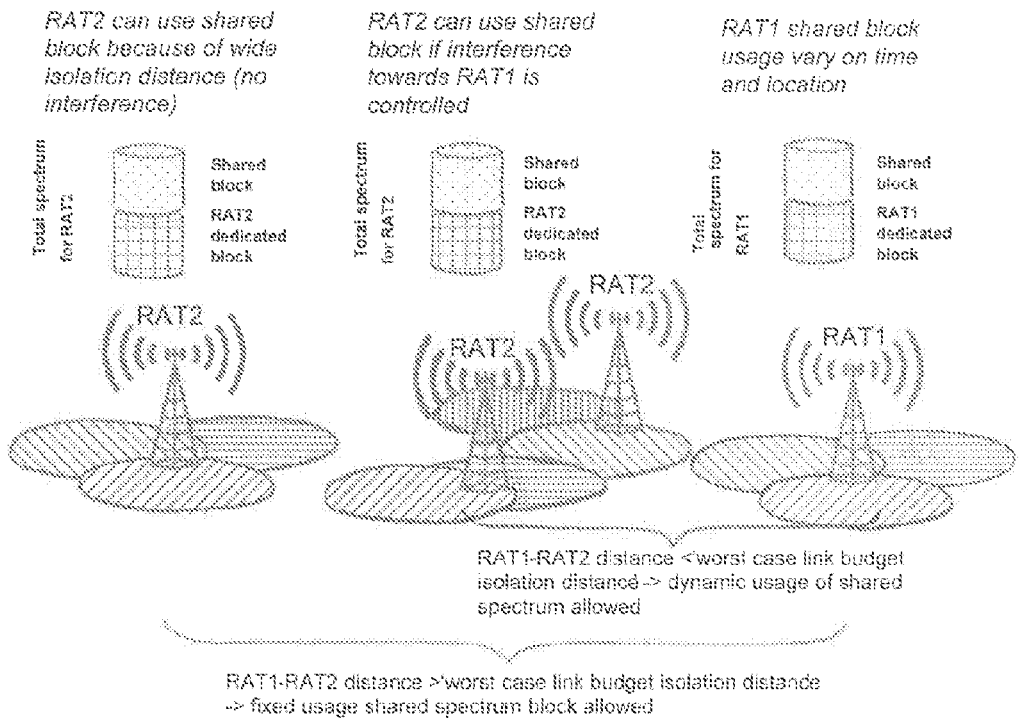
FIG. 2 shows a simplified block diagram illustrating exemplary isolation distances.

FIG. 2 illustrates exemplary isolation distances between base stations from different RATs, as well as the area where only dynamic usage of the spectrum is allowed. In FIG. 2, in an exemplary use case of spectrum sharing between RATs, a shared spectrum block (SSB) is allowed for RAT1 and RAT2. RAT1 is the primary user of SSB, and RAT2 is the secondary user of SSB. RAT1 and RAT2 are not allowed to use SSB simultaneously in the same cell, but simultaneous inter-cell usage is allowed. In the cases when inter-system isolation distance is high enough (i.e. there is no harmful interference between RATs), fixed usage of SSB usage is allowed. However, RAT2 cells which may cause significant interference to RAT1, only dynamic usage of SSB is allowed. In order to guarantee basic capacity in each cell, both RAT1 and RAT2 have a dedicated spectrum block that is not shared and is therefore free from co-channel inter-system interference.

BIM (background interference matrix) based methods may be used for inter-cell interference estimation and control. BIM may be used e.g. in a GSM DFCA and LTE ACCS targeting inter-system inter-cell interference estimation. BIM interference value may be calculated based on serving and neighbouring cell level measurements. Measurements are collected and statistical interference value is calculated. This way, a conditional interference value between two cells may be estimated, which value represents an average interference value between the cells. Using a BIM solution for inter-system interference estimation has been proposed. In that case, the estimation carried out inside one system is used also in another system. This is possible when the cells of different RATs are co-sited. Another approach is to collect measurements over the systems, and, in that way, compose a multi-layer background interference matrix.

The BIM solutions are based on a conditional interference value used together with radio resource allocation information. The BIM inter-cell interference value is a long term average interference value, and temporary interference estimation is carried out based on momentary radio resource allocation (in time, frequency, and power). An exemplary embodiment discloses estimating inter-cell interference directly, without using BIM. Another exemplary embodiment discloses using a BIM-based solution and the direct inter-cell interference estimation together, thus complementing each other.

An exemplary embodiment discloses estimating inter-system interference at a cell level, and based on this information adapting shared spectrum usage in the neighbouring cells. A neighbouring cell refers to a cell which is potentially causing interference towards the considered cell, or a cell which the considered cell is interfering. An exemplary embodiment enables obtaining an optimized isolation distance (i.e. a minimized number of cells in which usage of the shared spectrum is not allowed) which is able to adapt to varying interference and traffic conditions in surrounding cells.

An exemplary embodiment enables inter-system interference estimation for both primary and secondary systems. In the case of a primary system, inter-system interference estimation is based on a comparison of cell level measurement statistics before and after secondary spectrum usage in neighbouring cells. In the case of secondary system, inter-system interference estimation is based on a measurement on secondary spectrum before starting transmission on the secondary spectrum. The above inter-system inter-cell interference estimation for primary and secondary systems enables a cell level decision about secondary spectrum usage, and optimization of the radio resource allocation inside the systems, to be carried out.

Referring to FIG. 2, a shared spectrum block (SSB) is allowed for RAT1 and RAT2. RAT1 is the primary user of SSB, and RAT2 is the secondary user of SSB. RAT1 and RAT2 are not allowed to use SSB simultaneously in the same cell, but simultaneous inter-cell usage is allowed. An exemplary embodiment enables: minimizing the number of cells where the SSB usage is not allowed (which cells may also be referred to as buffer cells); estimating and controlling interference from RAT2 to RAT1 in order to protect primary system RAT1; and estimating interference from RAT1 to RAT2 and using it for inter-system interference control and RAT2 resource optimization.

An exemplary embodiment may be illustrated by means of the following steps.

Step 1 comprises the definition of a RAT1 reference interference level. A primary system defines a reference cell level interference value in the case where inter-system interference is not present. This reference value indicates incoming interference to the cell when there is no secondary usage of the spectrum.

Step 2 comprises the estimation of RAT2 inter-system interference. A secondary system carries out interference measurements in the shared spectrum and estimates a potential inter-system interference value from the primary system to the secondary system.

Step 3 comprises the estimation of RAT1 inter-system interference. When RAT2 starts transmission on a shared spectrum block, RAT1 repeats the cell level interference definition. Inter-system interference is estimated by comparing the new reference value defined in step 3 to the reference value defined in step 1.

Step 4 comprises the controlling of the RAT2 shared band usage. Based on the above inter-system interference estimations as well as other available interference estimations (e.g. BIM-based estimations), the RAT2 shared spectrum usage is controlled by 1) allowing the shared spectrum usage for RAT2 in a cell, or by 2) preventing the shared spectrum usage for RAT2 in a cell, or by 3) defining a maximum allowed transmission power for RAT2 transmission on the shared spectrum in a cell. Moreover, resource optimization (traffic steering) inside RAT2 may be carried out based on the interference conditions between a dedicated spectrum block and the shared spectrum block.

An exemplary embodiment enables inter-system interference estimation in the following use case:
 the primary system RAT1 is a GSM system;
 the secondary system RAT2 is an LTE system;
 both systems have a dedicated spectrum block, i.e. a block that is not shared between other systems;
 a shared spectrum block (SSB) may be used in both of the systems.

Figure 3:
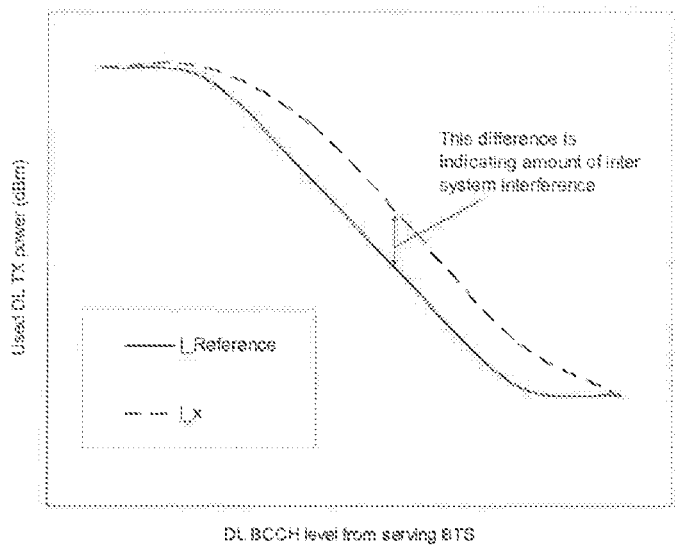
FIG. 3 shows a schematic diagram illustrating interference level estimation according to an exemplary embodiment.

Step 1 and step 3 involve inter-system interference level estimation in a GSM system, wherein the GSM cell interference level is defined based on the combination of: 1) RX quality (RXQUAL) measurements, 2) RX level (RXLEV)/DL BCCH RX level measurements, and 3) TX power levels used. GSM system CS speech power control is to keep the quality in the target value (between upper and lower RXQUAL thresholds). When the total interference level is increasing, more TX power is needed to maintain the target quality. Therefore, incoming interference level may be estimated by comparing used power levels versus DL BCCH levels for a target RXQUAL value. Alternatively, interference levels may be estimated based on RXQUAL and RXLEV only. However, usage of DL BCCH level and TX power information provides a more accurate estimation because the cell service area may change when the interference situation varies. The most accurate measurement may typically be carried out in an area where power control is able to adapt to the situation, i.e. in an area where neither minimum nor maximum power is limiting power adjustment. FIG. 3 illustrates a simplified example of how TX power levels versus DL BCCH level may be used to estimate inter-system interference in an exemplary embodiment. In the GSM interference level estimation of FIG. 3, I_Reference illustrates a reference curve without inter-system interference (i.e. no LTE transmitting on the same spectrum). I_x illustrates a curve when LTE interference is present on the shared spectrum.

An interfering cell or cells may be identified when a predefined group of RAT2 cells starts transmission (a group may refer to a single cell). The group of RAT2 cells may be defined based on step 2 measurements. Furthermore, other available inter-cell interference estimation information may be used, e.g. statistical results from a background interference matrix. In a later phase, when multiple cells or cell groups have been switched on, identification of interfering cells and estimation of their interference levels may be based on the cell TX power fluctuations.

Step 2 involves inter-system interference level estimation in LTE system, wherein interference level is estimated by comparing measured interference values over the carriers on SSB and dedicated spectrum block. At first, eNB measures both the received interference power (which includes thermal noise) as well as thermal noise power on UL of both SSB and the carrier on the spectrum block dedicated for LTE. By comparing the measured values across the carriers, eNB determines whether the UL interference level on SSB appears to be feasible. Also the X2 interface used for ICIC control may be added to interference level estimation. If the UL overload indication information element that eNB receives from the neighbouring LTE cells by using SSB, includes indications of high interference, eNB may e.g. bias its own inter-cell interference measurements on SSB to a larger value. Secondly, eNB starts to transmit necessary DL signals; at least synchronization signals and a common reference signal. eNB configures both reference signal received power and reference signal received quality measurements both on the dedicated LTE carrier and on SSB for a set of terminals. Again, by comparing the measured inter-cell interference values over the carriers for each UE reporting the measurements, eNB determines whether the DL interference level on SSB appears to be feasible.

Step 4 involves control of the RAT2 shared band usage, wherein there are various RRM processes and algorithms developed for interference control and optimization both in the GSM and LTE systems. In an exemplary embodiment, RRM processes may be enhanced by utilizing the new inter-system interference estimation results as described below.

According to an exemplary embodiment, GSM-LTE dynamic spectrum re-farming may be utilized because both systems are flexible for dynamic spectrum usage in frequency, time, and power domains. Moreover, it is expected that GSM networks will be up and running for years and that GSM spectrum will be gradually taken to LTE use (especially the 1800 MHz band). Therefore, dynamic and flexible spectrum sharing/re-farming solutions are needed.

In the following, exemplary implementation aspects for the above steps are disclosed:

RRM implementation may be carried out by means of common RRM (CRRM) so that information and measurements from one RAT are available for decision making in the other RAT. Common RRM refers to a radio resource management capability over multiple radio technologies in an operator's network. Depending on the CRRM implementation, information exchange between RATs may require standardization.

There are existing RRM algorithms for interference estimations, such as GSM DFCA and background interference matrix (BIM) based solutions. The inter-system interference estimations according to an exemplary embodiment may be used together with existing measurements and processes. The inter-system interference estimations according to an exemplary embodiment enable providing additional interference estimation capabilities for existing processes.

In order to estimate which cells are causing inter-system interference, RAT2 may inform RAT1 about used transmission powers in the neighbouring cells during the inter-system interference estimation period. In another implementation, a defined group of RAT2 cells start transmission ("group" may herein also refer to a single cell), and this way an interfering cell or cells may be identified. The group of RAT2 cells may be defined based on step 2 measurements. Furthermore, other available inter-cell interference estimation information may be utilized, such as e.g. statistical results from background interference matrix. Furthermore, in a later phase when multiple cells or cell groups have been switched on identification of interfering cells, their interference levels may be estimated based on the cell TX power fluctuations. In one implementation, step 4 may in particular use the power control commands for inducing fluctuations of the emitted power levels in one or more of the interfering cells. Such intentional fluctuations may in turn be used for carrying out a more reliable interference analysis.

An exemplary RRM solution may include that RAT2 gets feedback from RAT1 when estimated inter-system interference is too high, and then either RAT2 stops using the shared spectrum in selected neighbouring cells or limits transmit power in the neighbouring cells.

Based on incoming GSM interference towards LTE system, LTE traffic steering between the primary and secondary carriers may be carried out, e.g. in the case of high GSM interference, only the connections close to base station may be selected to the secondary carrier.

RAT2 (LTE) inter-system interference estimation is used to evaluate GSM interference towards LTE system in SSB. However, the same estimation may be used to estimate potential LTE interference towards GSM; when LTE estimates strong interference from GSM, it may be assumed that in the case of LTE transmission in SSB, LTE may have strong interference towards GSM.

An LTE muting solution (i.e. a signal muting pattern for muting selected LTE signals) may be used to avoid LTE interference towards critical GSM control signals. This way, higher inter-system interference towards GSM system may be allowed, and the number of buffer cells may be further reduced.

Thus, an exemplary embodiment enables minimizing the number of buffer cells, and a dynamic usage of the shared spectrum. Further, there is no need to have co-sited RATs for inter-system interference estimation that is needed in a basic BIM approach. Furthermore, an exemplary embodiment enables using already standardized intra-system measurements for inter-system interference estimation, and thus there is no need to have inter-RAT measurement support from the terminals. Therefore, an exemplary embodiment may also be implemented in the case of legacy GSM terminals.

Future cognitive radio networks may be able to provide more flexibility in the spectrum usage/in the secondary spectrum usage, and/or spectrum usage over multiple technologies. Therefore, an exemplary embodiment is not limited to dynamic spectrum re-farming between GSM and LTE, but it may be applied to future communications systems as well.

Thus, in an exemplary embodiment, an inter-system interference estimation solution is proposed for both primary and secondary systems. In the case of a primary system, inter-system interference estimation is based on a comparison of cell-level measurement statistics before and after secondary spectrum usage in the neighbouring cells. In the case of a secondary system, inter-system interference estimation is based on a measurement on secondary spectrum before starting transmission on the secondary spectrum. Based on both of the above mentioned inter-system inter cell interference estimation solutions, a cell-level decision about the secondary spectrum usage may be made, and furthermore, optimization of the radio resource allocation inside the systems may be carried out.

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network element, server, corresponding component, and/or to any communication system or any combination of different communication systems that support shared radio spectrum usage. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, without restricting the embodiment to such an architecture, however.

Figure 4:
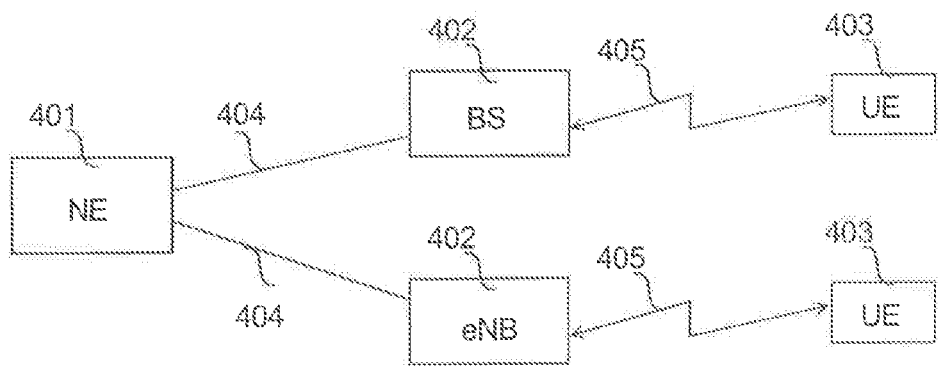
FIG. 4 shows a simplified block diagram illustrating exemplary system architecture.

With reference to FIG. 4, let us examine an example of a radio system to which embodiments of the invention can be applied. In this example, the radio system is based on LTE network elements. However, the invention described in these examples is not limited to the LTE radio systems but can also be implemented in other radio systems, such as UMTS (universal mobile telecommunications system), GSM, EDGE, WCDMA, CDMA2000, TD-SCDMA, bluetooth network, WLAN or other fixed, mobile or wireless network. In an embodiment, the presented solution may be applied between elements belonging to different but compatible systems such as LTE and UMTS.

A general architecture of a communication system is illustrated in FIG. 4. FIG. 4 is a simplified system architecture only showing some elements and functional entities, all being logical units whose implementation may differ from what is shown. The connections shown in FIG. 4 are logical connections; the actual physical connections may be different. It is apparent to a person skilled in the art that the systems also comprise other functions and structures. It should be appreciated that the functions, structures, elements, and protocols used in or for fixed or wireless communication are irrelevant to the actual invention. Therefore, they need not be discussed in more detail here.

The exemplary radio system of FIG. 4 comprises a network apparatus 401 of a network operator. The network apparatus 401 may include e.g. a common radio resource management (CRRM) node, a gateway GPRS support node (GGSN), MSC server (MSS), serving GPRS support node (SGSN), mobility management entity (MME), home location register (HLR), home subscriber server (HSS), visitor location register (VLR), or any other network element, or a combination of network elements. FIG. 4 shows the network node 401 operatively connected or integrated to a network element 402. The network element 402 may include a base station (BS, node-B, eNB), access point (AP), radio network controller (RNC), or any other network element or a combination of network elements. The network node 401 and the radio network node 402 are connected to each other via a connection 404 or via one or more further network elements. In FIG. 4, the radio network node 402 that may also be called a base station (BS) and/or eNB/RNC (enhanced node B/radio network controller) of the radio system hosts the functions for radio resource management in a public land mobile network. FIG. 4 shows one or more user equipment 403 located in the service area of the radio network node 402. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 4, the user equipment 403 is capable of connecting to the radio network node 402 via a connection 405.

FIG. 4 only illustrates a simplified example. In practice, the network may include more network elements and user terminals. The networks of two or more operators may overlap, the sizes and form of the cells may vary from what is depicted in FIG. 4, etc. The communication system may also be able to communicate with other networks, such as a public switched telephone network. The embodiments are not, however, restricted to the network given above as an example, but a person skilled in the art may apply the solution to other communication networks provided with the necessary properties. For example, the connections between different network elements may be realized with internet protocol (IP) connections.

Figure 5:
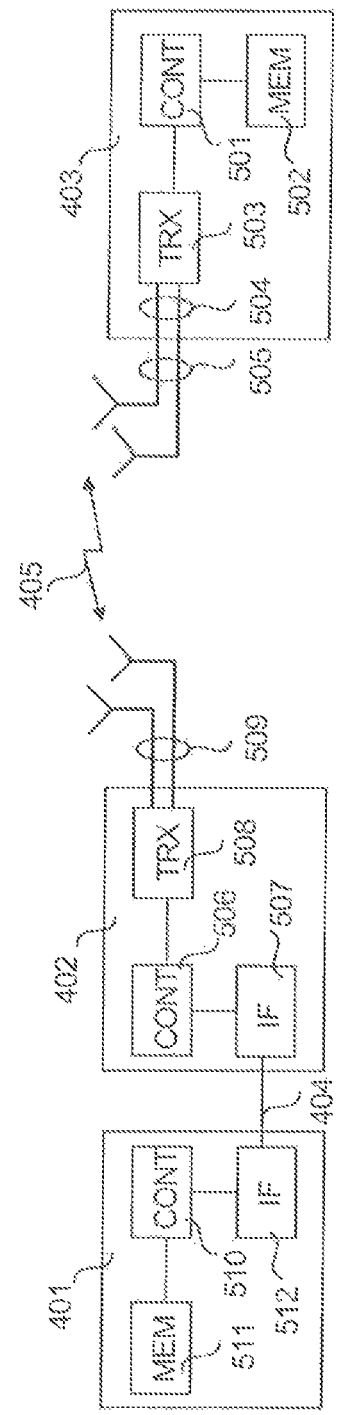
FIG. 5 shows a simplified block diagram illustrating exemplary apparatuses.

FIG. 5 illustrates examples of apparatuses according to embodiments of the invention. FIG. 5 shows a user equipment 403 located in the area of the radio network node 402. The user equipment is configured to be in connection with the radio network node 402. The user equipment or UE 403 comprises a controller 501 operationally connected to a memory 502 and a transceiver 503. The controller 501 controls the operation of the user equipment 403. The memory 502 is configured to store software and data. The transceiver 503 is configured to set up and maintain a wireless connection to the radio network node 402. The transceiver is operationally connected to a set of antenna ports 504 connected to an antenna arrangement 505. The antenna arrangement 505 may comprise a set of antennas. The number of antennas may be one to four, for example. The number of antennas is not limited to any particular number. The user equipment 403 may also comprise various other components, such as a user interface, camera, and media player. They are not displayed in the figure due to simplicity. The radio network node 402 comprises a controller 506 operationally connected to an interface 507 and a transceiver 508. The controller 506 controls the operation of the radio network node 402. The transceiver 508 is configured to set up and maintain a wireless connection to the user equipment 403 within the service area of the radio network node 402. The transceiver 508 is operationally connected to an antenna arrangement 509. The antenna arrangement may comprise a set of antennas. The number of antennas may be two to four, for example. The number of antennas is not limited to any particular number. The radio network node may be operationally connected (directly or indirectly) to another network element 401 of the communication system. The network element 401 may be a common radio resource management (CRRM) node, a gateway GPRS support node, an operations, administrations and maintenance (OAM) node, a home location register (HLR), visitor location register (VLR), MSC server (MSS), a mobile switching centre (MSC), serving GPRS support node, MME (mobility management entity), a base station controller (BSC), a gateway, or a server, for example. The network node 402 may be connected to more than one network element. The network node 402 may comprise an interface 507 configured to set up and maintain connections with the network elements. The network element or NE 401 may comprise a controller 510 and a memory 511 configured to store software and data and an interface 512 configured to be in connection with the network node 402. The network element 401 may be operationally connected (directly or indirectly) to another network element of the communication system. The embodiments are not, however, restricted to the network given above as an example, but a person skilled in the art may apply the solution to other communication networks provided with the necessary properties. For example, the connections between different network elements may be realized with internet protocol (IP) connections.

The memory may include volatile and/or non-volatile memory and typically stores content, data, or the like. For example, the memory may store computer program code such as software applications (for example for the detector unit and/or for the adjuster unit) or operating systems, information, data, content, or the like for the processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firm-ware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

User equipment may refer to any user communication device. A term "user equipment" as used herein may refer to any device having a communication capability, such as a wireless mobile terminal, a PDA, tablet, a smart phone, a personal computer (PC), a laptop computer, a desktop computer, etc. For example, the wireless communication terminal may be an UMTS or GSM/EDGE smart mobile terminal having wireless modem. Thus, the application capabilities of the device according to various embodiments of the invention may include native applications available in the terminal, or subsequently installed applications by the user or operator or other entity. The common radio resource management (CRRM) node may be implemented in any network element, such as a server.

FIG. 5 is a block diagram of an apparatus according to an embodiment of the invention. Although the apparatus has been depicted as one entity, different modules and memory may be implemented in one or more physical or logical entities.

The functionality of the network apparatus 401 is described in more detail below with FIGS. 6 and 7. It should be appreciated that the apparatus 401 may comprise other units used in or for distributed computing and/or data federation. However, they are irrelevant to the actual invention and, therefore, they need not to be discussed in more detail here.

The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a personal computer, a game console, a laptop (a notebook), a personal digital assistant, a mobile station (mobile phone), and a line telephone.

The apparatus 401, 402 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it may be communicatively coupled to the processor/computer via various means as is known in the art.

Figure 6:
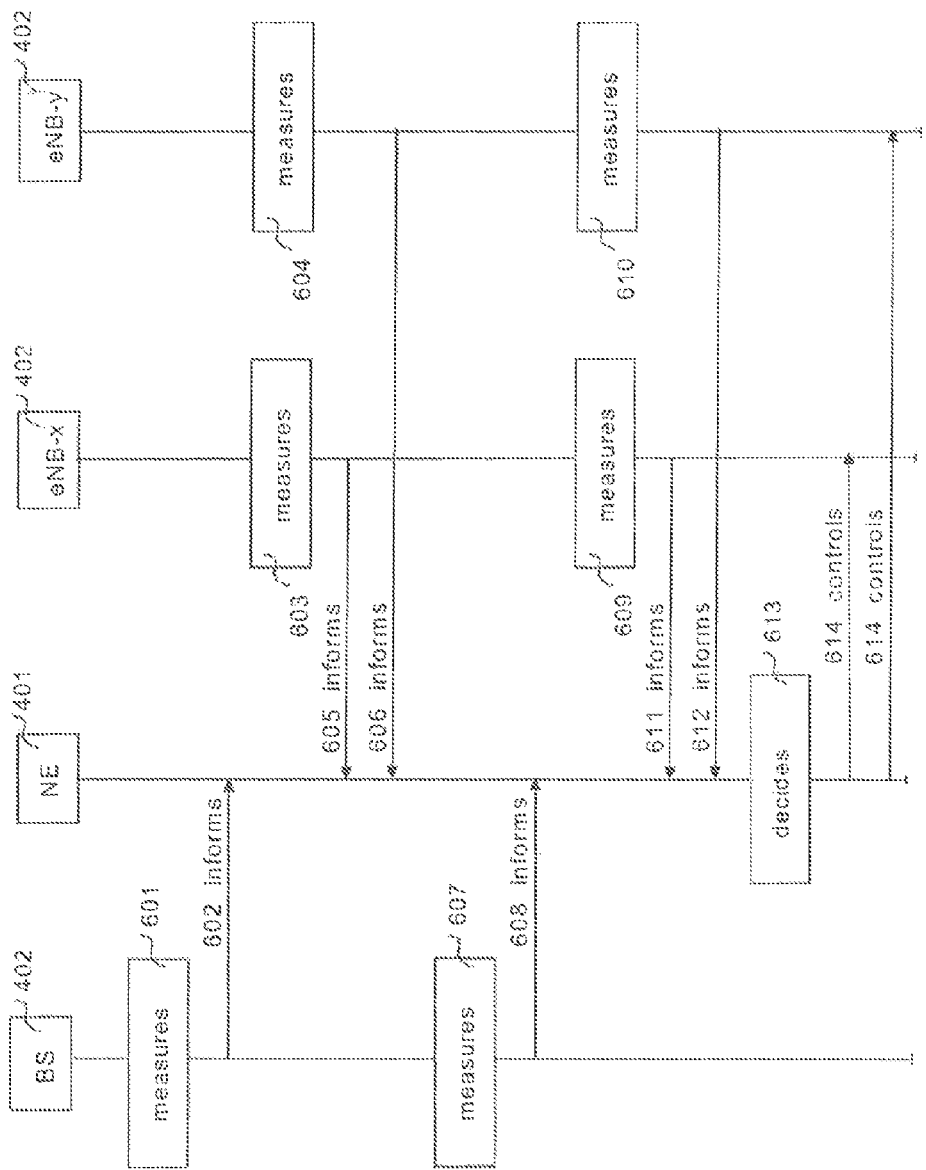
FIG. 6 shows a messaging diagram illustrating an exemplary messaging event according to an exemplary embodiment.

The signaling chart of FIG. 6 illustrates the required signaling. In the example of FIG. 6, a network apparatus 401 which may comprise e.g. a network element (network node), obtains 602 information on a reference interference level value defined 601, by a base station 402, for a first cell utilizing a primary radio access technology (e.g. GSM), the reference level interference value for the first cell indicating incoming interference to the first cell when there is no usage of radio spectrum of the primary radio access technology by a secondary radio access technology (e.g. LTE). Thus, in item 601, the base station 402 utilizing a primary radio access technology (RAT1 BS) measures interference level for the first cell, and, in a message 602, RAT1 BS forwards the measured interference level to NE.

In items 603, 604, a base station 402 utilizing a secondary radio access technology (e.g. RAT2 eNB-x, RAT2 eNB-y) determines a measure for emitted transmission power (allocation information) in the cells controlled by RAT2 eNB-x, RAT2 eNB-y respectively, and, in messages 605, 606, RAT2 eNB-x, RAT2 eNB-y forward the measured allocation information to NE. The network apparatus 401 further obtains 608 information on an estimated inter-system interference value defined for the first cell, wherein the estimated inter-system interference value defined for the first cell is calculated by comparing 613 the reference level interference value defined 601 for the first cell to an interference level value defined 607 for the first cell when the secondary radio access technology is using the shared radio spectrum block. Thus, in item 607, the base station 402 utilizing the primary radio access technology (RAT1 BS) measures interference level for the first cell, and, in a message 608, RAT1 BS forwards the measured interference level to NE. In items 609, 610, the base station 402 utilizing the secondary radio access technology (e.g. RAT2 eNB-x, RAT2 eNB-y) determines a measure for emitted transmission power (allocation information) in the cells controlled by RAT2 eNB-x, RAT2 eNB-y respectively, and, in messages 611, 612, RAT2 eNB-x, RAT2 eNB-y forward the measured allocation information to NE. In an optional step (not shown in FIG. 6), the network apparatus 401 may inform (based on 603 and 604) the second radio access technology (e.g. RAT2 eNB/RNC) on a cell group (which may also include a single cell) where the usage of the shared radio spectrum block is allowed.

The network apparatus 401 thus receives interference data from RAT1 BS and allocation data from at least one RAT2 eNB 402, wherein the network apparatus 401 may store 613 and/or analyse 613 the data. Thus, in item 613, NE performs an analysis of the experienced interference level in the cell of RAT1 BS, in response to emitted powers in the cells of RAT2 eNB-x and RAT2 eNB-y. The analysis performed in item 613 may comprise correlating changes of the reported interference levels (messages 602 and 608) with changes of reported emitted powers in messages 605, 606, 611 and 612. The sensitivity analysis provides information on how the various interfering cells of the secondary RAT contribute to the interference level experienced in the cell of the primary RAT. Based on the allocation information measured for second cells and the estimated inter-system interference value defined for the first cell, the network apparatus 401 is able to control 613, 614, 615 the usage of the shared radio spectrum in the at least one second cell, such that the network apparatus 401 may allow 613, 614, 615 the usage of the shared spectrum for the secondary radio access technology in the at least one second cell (and, optionally, define 613, 614, 615 a maximum allowed transmission power for the secondary radio access technology transmission on the shared radio spectrum in the at least one second cell), or prevent 613, 614, 615 the usage of the shared spectrum for the secondary radio access technology in the at least one second cell. The network apparatus thus transmits 614, 615 control data to RAT2 eNB (eNB/RNC-x and/or eNB/RNC-y) 402, wherein eNB 402 may implement the control data. Thus, in messages 614, 615, NE sends (based on the results of the analysis of item 613) commands to eNB/RNC-x and/or eNB/RNC-y for controlling their power. NE may in particular use the power control commands for inducing fluctuations of the power levels in one or more of the interfering cells. Such intentional fluctuations may in turn be used for carrying out a more reliable analysis on the interfering cells.

Figure 7:
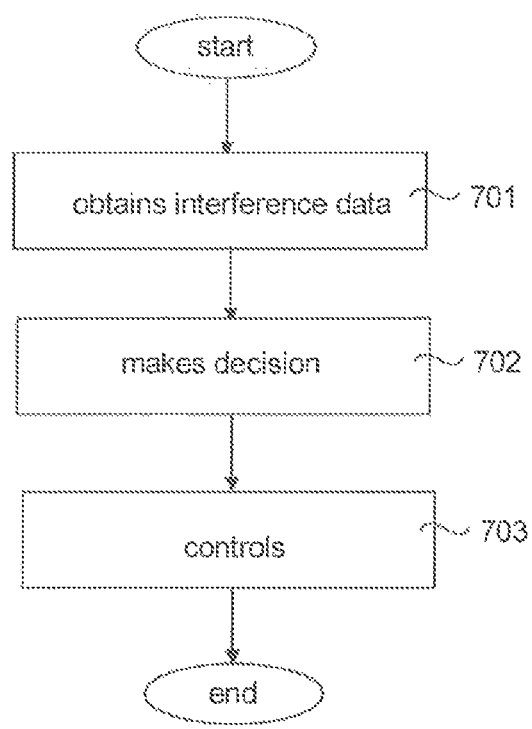
FIG. 7 shows a schematic diagram of a flow chart according to an exemplary embodiment.

FIG. 7 is a flow chart illustrating an exemplary embodiment. The apparatus 401, which may comprise e.g. a network element (network node, e.g. a common radio resource management node) obtains 701 information on a reference interference level value defined, by a base station 402, for a first cell utilizing a primary radio access technology (e.g. GSM), the reference level interference value for the first cell indicating incoming interference to the first cell when there is no usage of radio spectrum of the primary radio access technology by a secondary radio access technology (e.g. LTE). The network apparatus 401 further obtains 701 information on a measure for emitted power (allocation information) in the cells controlled by RAT2 eNB-x, RAT2 eNB-y measured, by RAT2 eNB-x, RAT2 eNB-y respectively. The network apparatus 401 further obtains 701 information on an estimated inter-system interference value defined for the first cell, wherein the estimated inter-system interference value defined for the first cell is calculated by comparing 702 the reference level interference value defined for the first cell to an interference level value defined for the first cell when the secondary radio access technology is using the shared radio spectrum block. The network apparatus 401 thus receives, in item 701, interference data from BS and allocation data from RAT2 eNB-x, RAT2 eNB-y 402, wherein the network apparatus 401 may store 702 and/or analyse 702 the data.

Based on the emitted power values measured for a second cell and the estimated inter-system interference value defined for the first cell, the network apparatus 401 may control 702, 703 the usage of the shared radio spectrum in the second cell, such that the network apparatus 401 makes, in item 702, a decision on whether to allow the usage of the shared spectrum for the secondary radio access technology in the second cell (and, optionally, define a maximum allowed transmission power for the secondary radio access technology transmission on the shared radio spectrum in the second cell), or prevent the usage of the shared spectrum for the secondary radio access technology in the second cell. The network apparatus thus transmits, in item 703, respective control data to eNB 402 to be implemented by eNB.

When interference increases, UEs close to a cell edge may receive better quality from the neighbouring cell. In an ideal case, the above measurements would be performed over the same set of UEs as a cell basis. However, as there is a time difference between the reference measure 601 and the "inter-system interference" measurement 608, it cannot be expected that the same UEs have a connection and that they stay on the same location. Thus, in an exemplary embodiment, a measurement may be performed for each connection in a cell, and statistical results may be generated. DL BCCH level is a good estimation of path loss.

In an exemplary embodiment, a sensitivity measurement may be carried out for any interference level Li to a new level Li+delta as it allows for some kind of feedback loop for adapting the power levels of the interfering cells.

Thus, according to an exemplary embodiment, there is provided a method for obtaining, in a network apparatus, information on a reference interference level value defined for a first cell utilizing a primary radio access technology, the reference level interference value for the first cell indicating incoming interference to the first cell by a secondary radio access technology; obtaining, in the network apparatus, information on an estimated emitted transmission power value measured for at least one second cell utilizing the secondary radio access technology; obtaining, in the network apparatus, information on an estimated inter-system interference value defined for the first cell, wherein the estimated inter-system interference value defined for the first cell is calculated by comparing the reference level interference value defined for the first cell to an interference level value defined for the first cell when the secondary radio access technology is using the shared radio spectrum block; controlling, in the network apparatus, the usage of the shared radio spectrum in the second cell based on the estimated emitted power value measured for a second cell and the estimated inter-system interference value defined for the first cell, wherein the shared radio spectrum usage in the second cell is controlled by allowing the usage of the shared spectrum for the secondary radio access technology in the second cell, and, optionally, defining a maximum allowed transmission power for the secondary radio access technology transmission on the shared radio spectrum in the second cell, or by preventing the usage of the shared spectrum for the secondary radio access technology in the second cell.

According to another exemplary embodiment, there is provided a method for carrying out resource optimization in the second cell based on interference conditions between a dedicated radio spectrum block and the shared radio spectrum block.

According to yet another exemplary embodiment, there is provided a method for controlling the usage of the shared radio spectrum in the second cell based on a BIM-based estimation and/or other available interference estimation.

According to yet another exemplary embodiment, there is provided a method for defining for the second radio access technology a cell group where the usage of the shared radio spectrum block is allowed, wherein the cell group is defined based on information on the inter-system interference value, or the cell group is a predefined group of cells.

According to yet another exemplary embodiment, there is provided a method for adapting, based on an inter-system interference estimation at a cell level, the usage of the shared radio spectrum in neighbouring cells, wherein an optimized isolation distance is calculated, the optimized isolation distance indicating a minimized number of cells in which usage of the shared radio spectrum is not allowed.

According to yet another exemplary embodiment, there is provided a method for obtaining information on the incoming interference level in the first cell, the incoming interference level being defined in the first cell based on RXQUAL measurements, RX level measurements, and used TX power levels by comparing used TX power levels versus DL BCCH levels for a target RXQUAL value, the RX level measurements including DL BCCH RX level measurements; or by estimating interference levels based on RXQUAL measurements and RX level measurements.

According to yet another exemplary embodiment, there is provided a method for obtaining information on the incoming interference level in the second cell, the incoming interference level being defined in the second cell by comparing measured interference values over the carriers on the shared radio spectrum block and the dedicated spectrum block, such that both received interference power, including thermal noise, as well as thermal noise power on uplink of both the shared radio spectrum block and the carrier on the radio spectrum block dedicated for the secondary radio access technology being measured in the base station, the measured inter-cell interference values are compared across the carriers, wherein it is determined if uplink interference level on the shared radio spectrum block appears feasible, and both reference signal received power and reference signal received quality measurements both on the dedicated secondary radio access technology carrier and on the shared radio spectrum block being configured for a set of terminals when downlink signals, including synchronization signals and common reference signals, are transmitted from the base station, the measured inter-cell interference values are compared in the base station or in the network apparatus over the carriers for each terminal reporting the measurements, wherein it is determined if downlink interference level on the shared radio spectrum block appears feasible.

According to yet another exemplary embodiment, there is provided a method for implementing radio resource management such that information from the first cell is available for decision making in the second cell.

According to yet another exemplary embodiment, there is provided a method for implementing radio resource management such that the second cell informs the first cell on used transmission powers in the neighbouring cells during an inter-system interference estimation period, in order to estimate which cells are causing inter-system interference, and, optionally, controlling, in the network apparatus, transmission powers used by the second cell, wherein the power control commands are used, in the network apparatus, for inducing fluctuations of the power levels in one or more of the interfering cells.

According to yet another exemplary embodiment, there is provided a method for implementing radio resource management such that the second cell receives feedback from the first cell when estimated inter-system interference is too high, wherein the second cell stops using the shared radio spectrum in selected neighbouring cells, and/or limits the transmission power in selected neighbouring cells.

According to yet another exemplary embodiment, there is provided a method for utilizing a muting pattern for muting selected signals, in order to avoid secondary radio access technology interference towards critical primary radio access technology control signals.

According to yet another exemplary embodiment, the first cell utilizes GSM technology.

According to yet another exemplary embodiment, the second cell utilizes LTE technology.

According to yet another exemplary embodiment, there is provided an apparatus comprising a communication control circuitry configured to obtain information on a reference interference level value defined for a first cell utilizing a primary radio access technology, the reference level interference value for the first cell indicating incoming interference to the first cell by a secondary radio access technology; obtain information on an estimated emitted transmission power value measured for at least one second cell utilizing the secondary radio access technology; obtain information on an estimated inter-system interference value defined for the first cell, wherein the estimated inter-system interference value defined for the first cell is calculated by comparing the reference level interference value defined for the first cell to an interference level value defined for the first cell when the secondary radio access technology is using the shared radio spectrum block; control the usage of the shared radio spectrum in the second cell based on the estimated emitted transmission power value measured for a second cell and the estimated inter-system interference value defined for the first cell, by allowing the usage of the shared spectrum for the secondary radio access technology in the second cell, and, optionally, defining a maximum allowed transmission power for the secondary radio access technology transmission on the shared radio spectrum in the second cell, or by preventing the usage of the shared spectrum for the secondary radio access technology in the second cell.

According to yet another exemplary embodiment, the communication control circuitry is further configured to carry out resource optimization in the second cell based on interference conditions between a dedicated radio spectrum block and the shared radio spectrum block.

According to yet another exemplary embodiment, the communication control circuitry is further configured to control the usage of the shared radio spectrum in the second cell based on a BIM-based estimation and/or other available interference estimation.

According to yet another exemplary embodiment, the communication control circuitry is further configured to define for the second radio access technology a cell group where the usage of the shared radio spectrum block is allowed, wherein the cell group is defined based on information on the inter-system interference value, or the cell group is a predefined group of cells.

According to yet another exemplary embodiment, the communication control circuitry is further configured to, based on an inter-system interference estimation at a cell level, adapt the usage of the shared radio spectrum in neighbouring cells, wherein an optimized isolation distance is calculated, the optimized isolation distance indicating a minimized number of cells in which usage of the shared radio spectrum is not allowed.

According to yet another exemplary embodiment, the communication control circuitry is further configured to obtain information on the incoming interference level in the first cell, the incoming interference level being defined in the first cell based on RXQUAL measurements, RX level measurements, and used TX power levels by comparing used TX power levels versus DL BCCH levels for a target RXQUAL value, the RX level measurements including DL BCCH RX level measurements; or by estimating interference levels based on RXQUAL measurements and RX level measurements.

According to yet another exemplary embodiment, the communication control circuitry is further configured to obtain information on the incoming interference level in the second cell, the incoming interference level being defined in the second cell by comparing measured interference values over the carriers on the shared radio spectrum block and the dedicated spectrum block, such that both received interference power, including thermal noise, as well as thermal noise power on uplink of both the shared radio spectrum block and the carrier on the radio spectrum block dedicated for the secondary radio access technology being measured in the base station, the measured inter-cell interference values are compared across the carriers, wherein it is determined if uplink interference level on the shared radio spectrum block appears feasible, and both reference signal received power and reference signal received quality measurements both on the dedicated secondary radio access technology carrier and on the shared radio spectrum block being configured for a set of terminals when downlink signals, including synchronization signals and common reference signals, are transmitted from the base station, the measured inter-cell interference values are compared in the base station or in the apparatus over the carriers for each terminal reporting the measurements, wherein it is determined if downlink interference level on the shared radio spectrum block appears feasible.

According to yet another exemplary embodiment, the communication control circuitry is further configured to implement radio resource management such that information from the first cell is available for decision making in the second cell.

According to yet another exemplary embodiment, the communication control circuitry is further configured to implement radio resource management such that the second cell informs the first cell on used transmission powers in the neighbouring cells during an inter-system interference estimation period, in order to estimate which cells are causing inter-system interference, and, optionally, control transmission powers used by the second cell such that the power control commands are used for inducing fluctuations of the power levels in one or more of the interfering cells.

According to yet another exemplary embodiment, the communication control circuitry is further configured to implement radio resource management such that the second cell receives feedback from the first cell when estimated inter-system interference is too high, wherein the second cell stops using the shared radio spectrum in selected neighbouring cells, and/or limits the transmission power in selected neighbouring cells.

According to yet another exemplary embodiment, the communication control circuitry is further configured to utilize a muting pattern for muting selected signals, in order to avoid secondary radio access technology interference towards critical primary radio access technology control signals.

According to yet another exemplary embodiment, the apparatus comprises a common radio resource management CRRM node of an LTE network.

According to yet another exemplary embodiment, there is provided an apparatus comprising at least one processor; and at least one memory including a computer program code, wherein the at least one memory and the computer program code are configured to, with the at least one processor, cause the apparatus to obtain information on a reference interference level value defined for a first cell utilizing a primary radio access technology, the reference level interference value for the first cell indicating incoming interference to the first cell by a secondary radio access technology; obtain information on an estimated emitted transmission power value measured for a second cell utilizing the secondary radio access technology; obtain information on an estimated inter-system interference value defined for the first cell, wherein the estimated inter-system interference value defined for the first cell is calculated by comparing the reference level interference value defined for the first cell to an interference level value defined for the first cell when the secondary radio access technology is using the shared radio spectrum block; control the usage of the shared radio spectrum in the second cell based on the estimated emitted transmission power value measured for a second cell and the estimated inter-system interference value defined for the first cell, by allowing the usage of the shared spectrum for the secondary radio access technology in the second cell, and, optionally, defining a maximum allowed transmission power for the secondary radio access technology transmission on the shared radio spectrum in the second cell, or by preventing the usage of the shared spectrum for the secondary radio access technology in the second cell.

According to yet another exemplary embodiment, there is provided a computer program comprising program code means adapted to perform any one of the method steps when the program is run on a computer.

According to yet another exemplary embodiment, there is provided a computer readable storage medium comprising computer readable code for executing a computer process according to any one of the method steps.

It will be obvious to a person skilled in the art that, as the technology advances, the inventive concept can be implemented in various ways. The invention and its embodiments are not limited to the examples described above but may vary within the scope of the claims.

List of Abbreviations
  BIM background interference matrix
  BCCH broadcast control channel
  CRRM common radio resource management
  DFCA dynamic frequency and channel allocation
  DL downlink
  DSR dynamic spectrum re-farming
  ETSI RRS ETSI reconfigurable radio system
  ETSI European telecommunications standards institute
  GSM global system for mobile communications
  ICIC inter-cell interference coordination
  IMT international telecommunication union
  LTE long term evolution
  RAT radio access technology
  RRM radio resource management
  RX receive
  RXQUAL received signal quality
  RXLEV received signal level
  SON self-optimized networks
  SSB shared spectrum block
  TP throughput
  TX transmit
  UE user equipment
  UL uplink
  HSPA high speed packet access
  DCR drop call rate
  BQS bad quality samples
  ACOS autonomous component carrier selection
  eNB enhanced node-B
  RAN radio access technology
  BS base station
  RNC radio network controller
  CDMA code division multiple access
  TD-SCDMA time division synchronous code division multiple access

The invention claimed is:

1. A method comprising
  obtaining, in a network apparatus, information on a reference interference level value defined for a first cell utilizing a primary radio access technology, the reference level interference value for the first cell indicating incoming interference to the first cell by a secondary radio access technology;
  obtaining, in the network apparatus, information on an estimated emitted transmission power value measured for at least one second cell utilizing the secondary radio access technology;
  obtaining, in the network apparatus, information on an estimated inter-system interference value defined for the first cell, wherein the estimated inter-system interference value defined for the first cell is calculated by
    comparing the reference level interference value defined for the first cell to an interference level value defined for the first cell when the secondary radio access technology is using the shared radio spectrum block;
  controlling, in the network apparatus, the usage of the shared radio spectrum in the second cell based on the estimated emitted power value measured for a second cell and the estimated inter-system interference value defined for the first cell, wherein the shared radio spectrum usage in the second cell is controlled by
    allowing the usage of the shared spectrum for the secondary radio access technology in the second cell, and, optionally, defining a maximum allowed transmission power for the secondary radio access technology transmission on the shared radio spectrum in the second cell, or
    preventing the usage of the shared spectrum for the secondary radio access technology in the second cell.

2. The method of claim 1, further comprising:
  carrying out resource optimization in the second cell based on interference conditions between a dedicated radio spectrum block and the shared radio spectrum block.

3. The method of claim 1 further comprising:
  controlling the usage of the shared radio spectrum in the second cell based on a background interference matrix based estimation and/or other available interference estimation.

4. The method of claim 1, further comprising:
  defining for the second radio access technology a cell group where the usage of the shared radio spectrum block is allowed, wherein the cell group is defined based on information on the inter-system interference value, or the cell group is a predefined group of cells.

5. The method of claim 1, wherein, based on an inter-system interference estimation at a cell level, the method comprises adapting, the usage of the shared radio spectrum in neighbouring cells, wherein an optimized isolation distance is calculated, the optimized isolation distance indicating a minimized number of cells in which usage of the shared radio spectrum is not allowed.

6. The method of claim 1, further comprising:
  obtaining information on the incoming interference level in the first cell, wherein the incoming interference level in the first cell is defined as follows:
    based on received signal quality measurements, receive level measurements, and used transmit power levels by comparing used transmit power levels versus downlink broadcast control channel levels for a target received signal quality value, the receive level measurements including downlink broadcast control channel receive level measurements; or
    by estimating interference levels based on received signal quality measurements and receive level measurements.

7. The method of claim 1, further comprising:
  obtaining information on the incoming interference level in the second cell, wherein the incoming interference level in the second cell by is defined as follows:
    comparing measured interference values over the carriers on the shared radio spectrum block and the dedicated spectrum block, such that
      both received interference power, including thermal noise, as well as thermal noise power on uplink of both the shared radio spectrum block and the carrier on the radio spectrum block dedicated for the secondary radio access technology being measured in the base station, the measured inter-cell interference values are compared across the carriers, wherein it is determined if uplink interference level on the shared radio spectrum block appears feasible, and both reference signal received power and reference signal received quality measurements both on the dedicated secondary radio access technology carrier and on the shared radio spectrum block being configured for a set of terminals when downlink signals, including synchronization signals and common reference signals, are transmitted from the base station, the measured inter-cell interference values are compared in the base station or in the network apparatus over the carriers for each terminal reporting the measurements, wherein it is determined if downlink interference level on the shared radio spectrum block appears feasible.

8. The method of claim 1, further comprising:

implementing radio resource management such that information from the first cell is available for decision making in the second cell.

9. The method of claim 1, further comprising:

implementing radio resource management such that the second cell informs the first cell on used transmission powers in the neighbouring cells during an inter-system interference estimation period, in order to estimate which cells are causing inter-system interference, and, optionally, controlling, in the network apparatus, transmission powers used by the second cell, wherein the power control commands are used, in the network apparatus, for inducing fluctuations of the power levels in one or more of the interfering cells.

10. The method of claim 1, further comprising:

implementing radio resource management such that the second cell receives feedback from the first cell when estimated inter-system interference is too high, wherein the second cell stops using the shared radio spectrum in selected neighbouring cells, and/or limits the transmission power in selected neighbouring cells.

11. The method of claim 1, further comprising:

utilizing a muting pattern for muting selected signals, in order to avoid secondary radio access technology interference towards critical primary radio access technology control signals.

12. The method of claim 1, wherein the first cell utilizes global system for mobile communications technology.

13. The method of claim 1, wherein the second cell utilizes long term evolution technology.

14. An apparatus comprising at least one processor; and at least one memory including a computer program code, wherein the at least one memory and the computer program code are configured to, with the at least one processor, cause the apparatus to obtain information on a reference interference level value defined for a first cell utilizing a primary radio access technology, the reference level interference value for the first cell indicating incoming interference to the first cell by a secondary radio access technology;

obtain information on an estimated emitted transmission power value measured for a second cell utilizing the secondary radio access technology;

obtain information on an estimated inter-system interference value defined for the first cell, wherein the estimated inter-system interference value defined for the first cell is calculated by comparing the reference level interference value defined for the first cell to an interference level value defined for the first cell when the secondary radio access technology is using the shared radio spectrum block;

control the usage of the shared radio spectrum in the second cell based on the estimated emitted transmission power value measured for a second cell and the estimated inter-system interference value defined for the first cell, by allowing the usage of the shared spectrum for the secondary radio access technology in the second cell, and, optionally, defining a maximum allowed transmission power for the secondary radio access technology transmission on the shared radio spectrum in the second cell, or preventing the usage of the shared spectrum for the secondary radio access technology in the second cell.

15. A computer program product comprising at least one non-transitory computer-readable storage medium having computer-executable program code instructions stored therein, wherein execution of the computer-executable program code instructions by a processor configures an apparatus to at least:

obtain information on a reference interference level value defined for a first cell utilizing a primary radio access technology, the reference level interference value for the first cell indicating incoming interference to the first cell by a secondary radio access technology;

obtain information on an estimated emitted transmission power value measured for a second cell utilizing the secondary radio access technology;

obtain information on an estimated inter-system interference value defined for the first cell, wherein the estimated inter-system interference value defined for the first cell is calculated by comparing the reference level interference value defined for the first cell to an interference level value defined for the first cell when the secondary radio access technology is using the shared radio spectrum block;

control the usage of the shared radio spectrum in the second cell based on the estimated emitted transmission power value measured for a second cell and the estimated inter-system interference value defined for the first cell, by allowing the usage of the shared spectrum for the secondary radio access technology in the second cell, and, optionally, defining a maximum allowed transmission power for the secondary radio access technology transmission on the shared radio spectrum in the second cell, or preventing the usage of the shared spectrum for the secondary radio access technology in the second cell.

* * * * *